Patented Apr. 25, 1933

1,905,285

UNITED STATES PATENT OFFICE

RICHARD HERZ, OF FRANKFORT-ON-THE-MAIN, AND WERNER ZERWECK, OF FRANK-FORT-ON-THE-MAIN-FECHENHEIM, GERMANY, ASSIGNORS TO GENERAL ANILINE WORKS, INC., OF NEW YORK, N. Y., A CORPORATION OF DELAWARE

PROCESS OF BROMINATING ANTHANTHRONE

No Drawing. Original application filed November 1, 1926, Serial No. 145,697, and in Germany November 7, 1925. Divided and this application filed December 11, 1929. Serial No. 413,418.

This application is a division of our co-pending application Serial No. 145,697 filed November 1, 1926.

We have found that valuable vat dyestuffs of the anthanthrone series are obtainable by causing a brominating agent to act upon anthanthrone in the presence of an inert organic diluent. The reaction can be carried out at ordinary or at elevated temperatures up to the boiling point of the inert organic diluent.

As suitable inert organic diluents there may be used: aromatic nitro- and chlorinated hydrocarbons as, for instance, nitrobenzene and trichlorobenzene, which are inert to the brominating agents under the conditions applied.

According to our new process, one or more bromine atoms may be introduced into the anthanthrone molecule by mixing finely powdered anthanthrone with bromine, in the presence of an inert organic diluent as before-stated, and stirring the mixture for some hours at ordinary or at elevated temperatures up to the boiling point of the inert organic diluent, and also preferably with the addition of a suitable carrier, such as iodine, antimony pentachloride, ferric chloride, iodine trichloride and so forth.

The most valuable products are obtained when the bromination is carried out in such a way that approximately two atoms of bromine enter into the molecule of the anthanthrone.

The new dyestuffs, corresponding probably to the general formula:

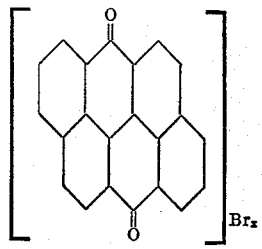

in which formula X is approximately the number 2, which dyestuffs are when dry red powders difficultly soluble in organic solvents of a higher boiling point, easily soluble in concentrated sulfuric acid with a pure green color, and dyeing vegetable fibers from a violet vat reddish-orange shades of exceptional brightness and excellent fastness, particularly to light.

In order to further illustrate our invention, the following example is given, the parts being by weight and all temperatures in centigrade degrees, but it is understood that our invention is not limited to the particular products or reaction condition mentioned therein:

Example 1 part of anthanthrone is mixed with about 20 parts of nitrobenzene or any other suitable organic solvent or diluent, for instance, highly chlorinated benzene. Then 3 parts of bromine are added and the mass is warmed to 160°, while stirring, until no more hydrobromic acid is evolved. For finishing the reaction, the mass is shortly heated to the boiling point of the liquid. After cooling down, the separated dyestuff is filtered, washed with the diluent used, then with spirit and then dried. The addition of a suitable carrier, such as iodine or antimony pentachloride is of an advantage, because the brominating process is accelerated by it.

We claim:

The process which comprises reacting upon 1 part of anthanthrone in the presence of about 20 parts of nitrobenzene with 3 parts of bromine at a temperature of from 160° to the boiling point of the liquid.

In testimony whereof we affix our signatures:

RICHARD HERZ.
WERNER ZERWECK.